Aug. 23, 1966  J. R. PARRISH  3,268,907
POSITION PLOTTING APPARATUS FOR USE IN CONJUNCTION WITH RADAR
Filed Dec. 16, 1963  4 Sheets-Sheet 1

INVENTOR
Joseph Reginald Parrish
BY
Shoemaker and Mattare
ATTORNEYS

FIG.2.

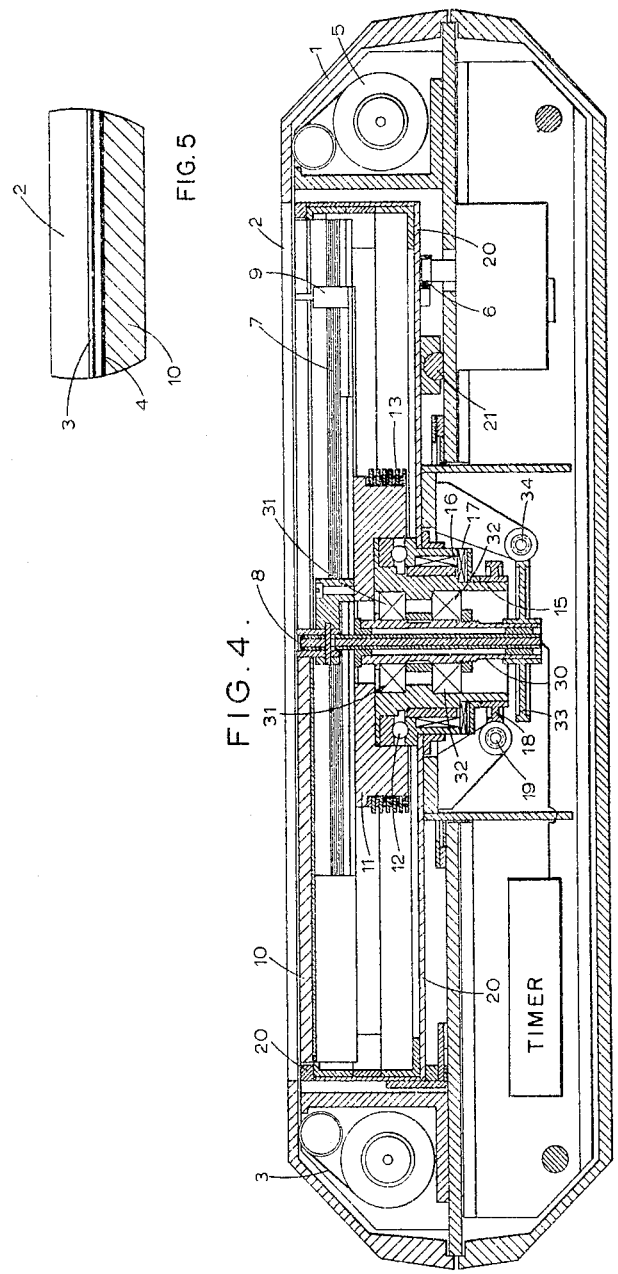

United States Patent Office 3,268,907
Patented August 23, 1966

3,268,907
POSITION PLOTTING APPARATUS FOR USE IN CONJUNCTION WITH RADAR
Joseph R. Parrish, Richmond, England, assignor, by mesne assignments, to Autoplot Limited, Richmond, England, a company of Great Britain
Filed Dec. 16, 1963, Ser. No. 330,682
Claims priority, application Great Britain, Dec. 21, 1962, 48,355/62
9 Claims. (Cl. 346—8)

This invention relates to methods and apparatus to be used in conjunction with radar with the object of reducing the hazard of collision between ships at sea.

The chief object of the invention is to reduce the hazard of collision at sea by providing means for transferring information from a radar to a plotting sheet or to plotting sheets for other purposes described hereinafter, such as mine-sweeping, coastal navigation and trawling, the invention also providing means for recording and displaying the information derived over a period of time from the radar in such a manner that mariners may easily and speedily assess the environmental traffic movements and be enabled to avoid collision.

The invention assists the mariner in showing him, when his ship is threatened with collision into which area he may manoeuvre his vessel without at the same time instigating another collision situation involving other vessels. If, in spite of his endeavours the mariner becomes involved in a collision incident the invention also provides a complete record of events leading up to the collision for subsequent analysis.

The apparatus consists of two main parts, the transmitter, by means of which information is picked off the radar screen and relayed to the second part; the plotting cabinet, which may be remote from the radar and upon which the information is displayed.

The transmitter may be automatic or manually operated. The principles of operation are similar except that photocells or other technical means replace the human operator. The manually operated device is considered the more desirable apparatus, chiefly because automatic means plot too much redundant information, and is more prone to failure as well as being more expensive.

Broadly stated, the manner in which the invention achieves its object is by making simultaneously two separate records of the information transmitted at approximately regular time intervals from the radar screen. The first record constitutes the so-called "relative plot" and is made on a stationary recording sheet and the second is made upon a moving sheet of paper and forms the geographical plot known as the "true plot."

The moving sheet is preferably translucent and is moved over the stationary sheet, the arrangement being such that both series of plots are visible for interpretation.

The apparatus according to the invention is intended to be employed in conjunction with any common type of commercial radar apparatus having P.P.I. (Plan Position Indication) presentation and in the general case giving a so called "relative" display, i.e. a radar which indicates the range and bearing of any target detected relative to the position of the observing ship at the time of detection.

The apparatus according to the invention can, however, with some modification be employed in conjunction with radar apparatus of the so-called "True motion" type, but the description below refers only to apparatus intended for use with "relative" radar.

The invention will be described with reference to the accompanying drawings in which FIGURES 1 and 2 illustrate plotting sheets as they might appear after the plotting of an imaginary situation has been proceeded with for twenty minutes, "relative" plots being shown on FIGURE 1, while "true" plots are shown on FIGURE 2.

FIGURE 4 is a cross-sectional view through a plotting cabinet according to a preferred embodiment of the invention; such cabinet being equipped with means for simultaneously marking the "relative" and "true" plotting sheets and for displaying both series of plots for interpretation.

FIG. 5 is a magnified section showing the relative position of the transparent panel, the two separate plotting sheets and the luminescent panel.

A basic principle of navigation employing radar as an aid is that if a target vessel, i.e. a ship detected by the radar apparatus of the observer ship, is observed over a period of time to be on a constant bearing and closing in range it constitutes a collision hazard.

Figure 1:
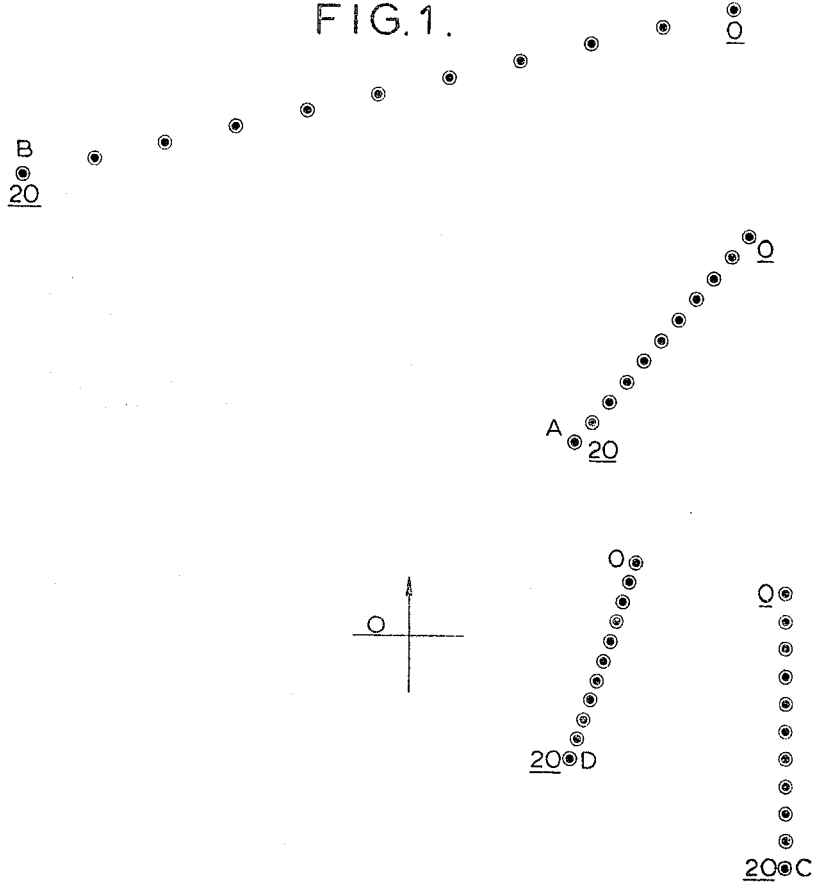

Thus, in FIGURE 1, the centre of the plotting sheet marked by a cross is conveniently treated as the position of the observing ship. Four target ships A, B, C and D have been plotted as regards range and bearing from the observing ship O, at two minute intervals over the preceding twenty-minute period. Of these targets, A is clearly on a constant bearing and with closing range, while ships B, C and D are each at bearings which are changing.

This demonstrates the utility of a "relative" plot in determining whether a collision hazard exists. However, when a collision hazard has been established it may be the duty of the observing ship O to manoeuvre to avoid collision but this manoeuvre must be made in such manner that no further hazards are engendered.

Figure 2:
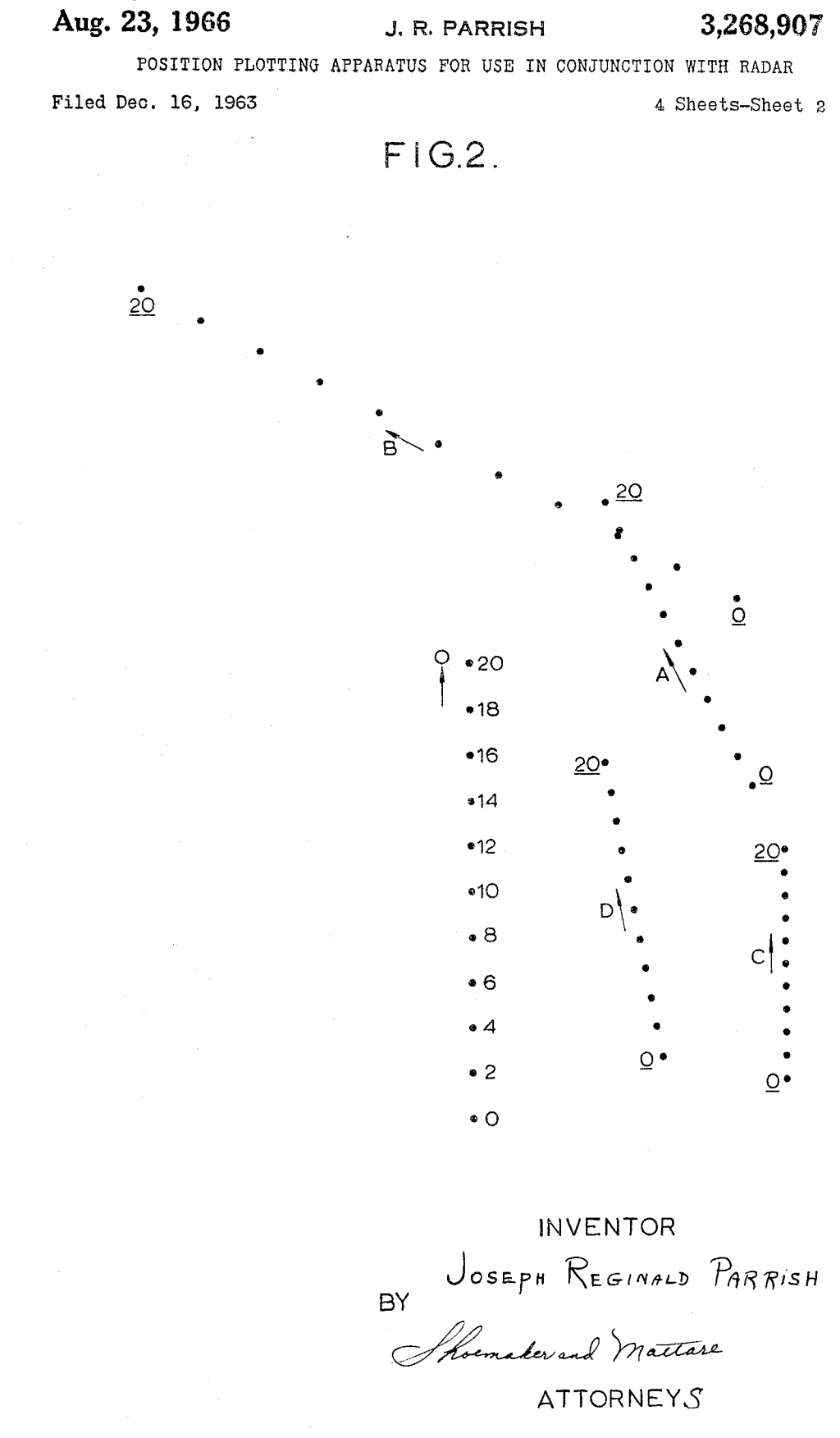

Thus in FIGURE 2, which shows a "true" or geographical plot of the situation plotted and displayed in "relative" plots in FIGURE 1, if the observer ship O were to alter course to starboard in order to avoid target ship A it might manoeuvre on to a collision course with target ship C. Moreover, if O merely reduces speed to avoid A this might result in O now being on a collision course with target ship D which would otherwise have passed astern.

It will be seen that both plots have their significance, in that the "relative" plot, FIGURE 1, indicates collision hazards while the "true plot," FIGURE 2, indicates what safe manoeuvres may be made to avoid collision.

It has hitherto been the recommended practice to prepare a "relative" plot graphically, i.e. manually, and from this to construct a "true" plot by geometric means. This is so laborious a practice that it is often neglected altogether or until a very late moment in a collision situation, when much valuable previous information may have been unrecorded. It is therefore, advantageous to provide apparatus whereby "relative" and "true" plots can be simultaneously produced and displayed so easily or with such economy of time that it is possible to maintain the plotting procedure continuously.

According to the invention such apparatus preferably includes a transmitter which picks off or receives "relative" information, i.e. details of range and bearings of any target detected, from a radar. (Such transmitter may be as described in co-pending patent application Serial No. 293,515 filed July 8, 1963.)

The transmitter passes such information to the plotting apparatus, a preferred embodiment of which is hereafter described with reference to FIGURE 4.

The plotting cabinet is a generally rectangular box 1 with a transparent panel 2 on its upper surface. Plotting sheets are displayed under the glass and printing occurs from beneath the plotting sheets. There are two plotting sheets in the cabinet one above the other in close juxtaposition. The top sheet 3 is part of a long roll of paper; it is moved at a speed corresponding to one rectangular component of the plotting ship's vector and upon this sheet is made the so-called "true" plot of the surrounding traffic and also a record of the plotting ship's own track, complete with time markers. It thus constitutes a plot of the type shown in FIGURE 2.

The sheet 4 below is a stationary sheet, which is replaced from time to time as required, and upon this the "relative" plot (of a type similar to that shown in FIGURE 1) is printed.

Within the cabinet is a simple electro-mechanical computer which resolves the course and speed of the observing ship into rectangular coordinates. The observer ship's speed is fed manually into the computer and the course information is derived either from the ship's gyro or from a magnetic device specially developed for this purpose. One component is used to drive rollers 5 for moving the plotting sheet 3 in a fore-and-aft direction, while the other is used to move a carriage 20 housing the printing apparatus laterally within the cabinet suitably by a rack and pinion arrangement 6. The printing system consists of a gantry 7 which can be rotated in azimuth carrying a printing head 9 which can be moved radially from the centre of rotation of the gantry. At the centre of the gantry is apparatus including a printing head 8 for printing "own position" and time. Own position and time are printed through a small hole, say half an inch in diameter, in the under sheet and appear only upon the upper moving sheet 3 (on the "true" plot). The fixed under sheet 4 upon which the "relative" plot is made, is preferably a square piece of red translucent plastic material. The range-and-bearing printing head 9 has a warm metal element which, in the printing operation, melts the plastic 4, leaving a small hole and also marks the plotting sheet 3, it may be by charring or even burning a small hole or by transferring plastic to the under side of the plotting sheet 4, where it congeals in the fabric of the paper leaving a permanent mark. Correct illumination beneath the plotting sheets shows the "relative" plot as a series of light dots and the "true" plot as a series of dark dots against a red background. A most important aspect is that at all times the relative plots and true plots are tied together and can be instantly related. Such illumination is provided by an electro luminescent panel 10 which emits light and which can be controlled so that at night time only the bright dots of the "relative" plot—the warning plot—are visible. When danger threatens the lighting may be increased to show the true plot and help in deciding a safe manoeuvre.

The panel 10 is a circular disc with a radial slot to provide access to the plotting sheets 3 and 4 for the printing head 9.

The gantry 7 and the panel 10 are fixed to a table 11 which is mounted by means of bearings 12 for rotation within the carriage 20. 13 represents contact rings by which electric current may be passed to the panel 10 and to the printing heads 8 and 9. The table 11 has depending downwardly from it a hollow sleeve 15 mounted within bearings 16 and 17. At its lower end the sleeve 15 has a gear wheel 18 which is engaged with a drive 19 which may be operated to rotate the table 11, the gantry 7 and the printing head 9, in azimuth.

The carriage 20 is supported for transverse sliding movement on bearing means 21 and as referred to above such transverse movement is effected through the medium of the rack and pinion arrangement 6.

A sleeve 30 is mounted by bearing 31 and 32 for rotational movement within the sleeve 15. Rotation of the sleeve 30 relative to the carriage 20 will effect movement of the printing head 9 longitudinally of the gantry 7 along the radial slot in the panel 10. The lower end of the sleeve 30 carries a gear 33 engaged by a drive 34.

The method of operation is that at regular intervals— every two or three minutes for preference—the operator makes a sweep of the radar screen with a cursor or strobe. The targets are covered in azimuth and then bracketed by a range marker.

As the operator rotates the strobe in azimuth it is to be understood that the drive 19 will be brought into operation to cause rotation of the gantry 7 in sympathy with that of the strobe. Similarly when the operator moves the range marker to bracket the target the drive 34 will be brought into operation to cause sympathetic movement of the printing head 9 along the gantry 7. As previously described this apparatus is preferably employed in conjunction with the transmitter described in the aforementioned co-pending application, and it will be understood that using such equipment, the sympathetic movement of the printing head will be effected substantially simultaneously with the movement of the strobe in range and azimuth.

When the operator has covered a selected target in azimuth and range, he presses a button and this will cause electric current to be fed to warm the metallic element of the printing head 9 and this will be effective to mark both plotting sheets 3 and 4.

It is clear that in busy waters some filtering may be necessary and a selection of targets printed instead of each and every ship. Plots can be made at the rate of 2 to 2½ seconds per ship.

The plot of the observing ship is automatic and continuous at two or three minute intervals with time markings being effected, it may be at the hour and every tenth or twelfth minute. The paper upon which the true plot is made can be given an arbitrary heading corresponding to the mean line of advance of the observing vessel and the lateral movement of the carriage 20 enables the plot to be continued when the observing ship deviates from course up to a distance of ten miles either side of the intended route. If a major alteration of route is made, it is necessary to start a new plot.

Range indication in much radar equipment is non-linear to a high degree and provision is made to correct range transmissions so that the plots are printed to a linear scale. The ranges incorporated in the plotting system are 15 miles maximum, 7½ miles maximum or 3½ miles and, since the gantry 7 has a printing radius of 7½ inches, these correspond to scales of ½ inch to 1 inch and 2 inches to the mile. By simple adjustment these scales may be changed to suit ships' special requirements. Any of the radar range scales may be used to plot on any one of the above scales and changing the radar range scale does not affect the plotting scale. However, it is clear that when the plotting scale is changed it is necessary to start a new plot.

Figure 3:
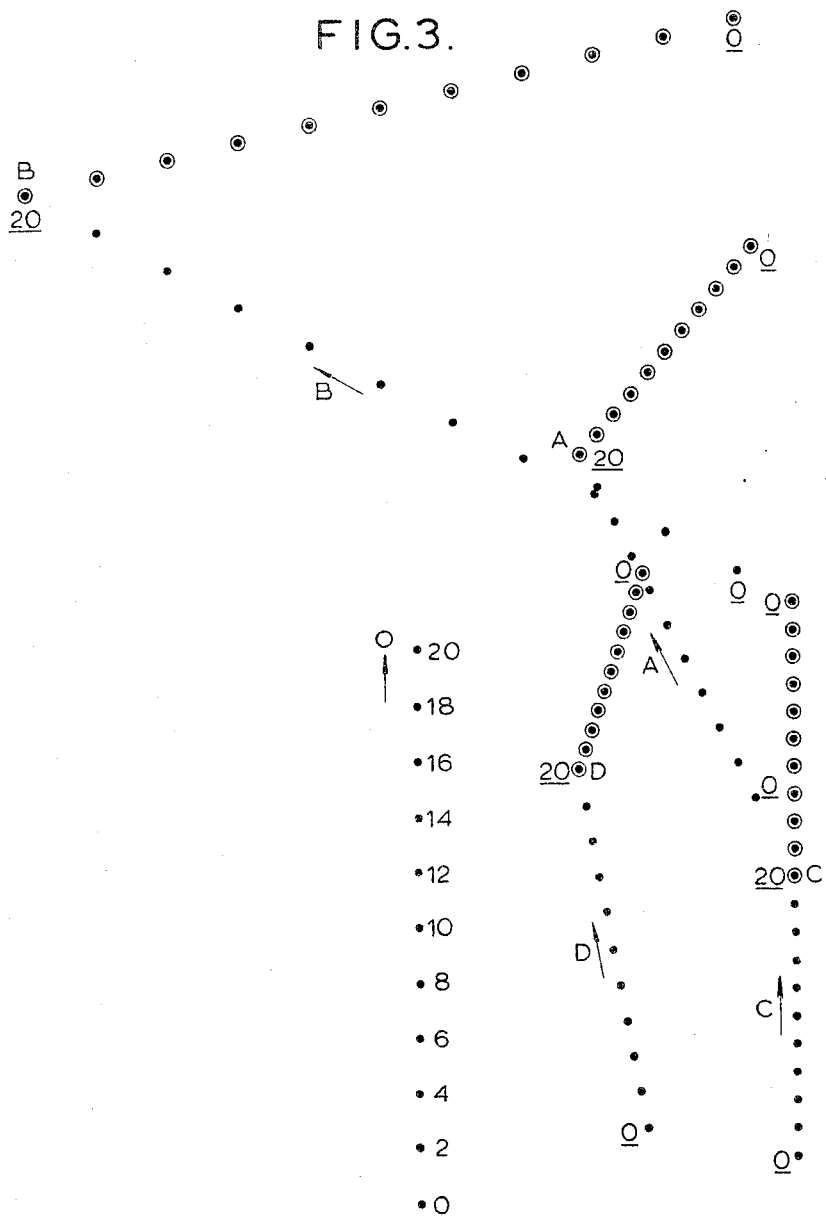
FIGURE 3 illustrates a combination of the plots of the two systems in respect of the said imaginary situation after twenty minutes plotting displayed in co-ordination by means and apparatus according to the invention.

FIGURE 3 illustrates diagrammatically the resultant appearance of the superposed plotting sheets when the situation plotted in FIGURES 1 and 2 has been reproduced in combination by means and apparatus according to the invention. For the sake of clarity more time indications are shown that would in practice be the case, for in the case of the last plots made at any time, the "relative" plots (shown encircled) and the "true" plots are identical in respect of any one detected target.

In practice no time marking will be made by the apparatus against the target plots.

The situation displayed in FIGURE 3 is again after 20 minutes plotting and provides a clear indication, simultaneously of what targets constitute a collision hazard and what manoeuvre can be safely made by the observing ship. In this particular instance any reduction of speed or change of course to starboard on the part of O, although it would remove any hazard of collision with A, would engender further danger as regards C or D. Therefore, an increase of speed of O or a change of course to port is clearly called for. This will not involve any danger from B as the latter is moving comparatively fast and is already well ahead on the port quarter, while, if either or both of these manoeuvres are made, and given that A and D maintain their existing courses and speeds, they will both pass astern.

It will be further apparent that the combined plots shown in FIGURE 3, provides means whereby the time and positions of the vessels when any given target most closely approaches the observer vessel, can be readily adduced in advance. For example, it would be possible to calculate when target D will cross the wake of the observer and what distance will then separate the two ships.

The electro-luminescent panel 10 situated beneath the plotting sheets will illuminate all the plots made so that they are visible for interpretation by the mariner.

If desired, manual controls may be provided on the cabinet 1 for setting the devices 6, 19 and 34 in train and for causing the printing head 9 to mark the sheets.

I claim:

1. Apparatus for recording and displaying positional information derived from radar apparatus comprising a first marking means, two superposed plotting sheets with one of said sheets being fixed in relation to said first marking means, means for effecting relative movement between said sheets at a rate and in a direction proportional to the movement of the observing radar apparatus and a second means in addition to said first marking means for simultaneously marking on said superposed sheets the co-ordinates, relative to the observing radar apparatus of selected targets observed by the radar apparatus.

2. Apparatus according to claim 1, said first named marking means comprising means for marking on one of said sheets the position of the observing radar apparatus relative to the selected targets being indicated.

3. Apparatus according to claim 1, wherein the first marking means has means for causing the plots of the observing radar apparatus to be made at regular time intervals.

4. Apparatus according to claim 1, including means for moving the first marking means, together with the plotting sheet which is fixed in relation to the said first marking means, in a lateral direction relative to the second plotting sheet at a rate proportional to any alteration of one rectangular horizontal component of the vector of the observing radar, and means for moving said second sheet longitudinally in relation to the printing device and to said first mentioned plotting sheet at a rate proportional to any alteration in the second rectangular horizontal component of the vector of the observing radar.

5. Apparatus according to claim 4, wherein the upper plotting sheet is constituted by a long roll of paper, while the lower sheet is constituted by a sheet of translucent plastic material, said sheets being in close juxta-position.

6. Apparatus according to claim 1, wherein the first marking means comprises a gantry arranged to be rotated in azimuth to correspond with bearings of selected targets observed by the radar apparatus, a printing head having means capable of marking said plotting sheets and said head being arranged to move along the gantry to positions spaced radially from the axis of rotation of the gantry proportional to the ranges of the selected targets observed.

7. Apparatus according to claim 6, wherein the printing means comprises a metal element which, when heated, melts, chars or burns the superposed plotting sheets simultaneously.

8. Apparatus according to claim 6, wherein an electro luminescent panel is carried on the gantry and is adapted to illuminate said plotting sheets from below.

9. Apparatus according to claim 6, wherein there are provided at the axis of rotation of the gantry, means for marking on one of said superposed plotting sheets the position of the observing radar apparatus.

References Cited by the Examiner

UNITED STATES PATENTS

| | | | |
|---|---|---|---|
| 2,697,827 | 12/1954 | Whitaker | 343—10 |
| 2,872,272 | 2/1959 | Schuck | 346—8 |
| 3,001,192 | 9/1961 | Hammond | 343—11 |
| 3,050,731 | 8/1962 | Usdin | 346—1 |
| 3,067,931 | 12/1962 | Masse | 235—61 |
| 3,072,908 | 1/1963 | Parrish | 346—8 |
| 3,090,043 | 5/1963 | Wilkenson | 343—11 |
| 3,175,221 | 3/1965 | Hammett | 346—1 |

LOUIS J. CAPOZI, *Primary Examiner.*

LEO SMILOW, *Examiner.*

JOSEPH W. HARTARY, *Assistant Examiner.*